US012395019B2

(12) United States Patent
Ruan et al.

(10) Patent No.: US 12,395,019 B2
(45) Date of Patent: Aug. 19, 2025

(54) CLAW-POLE MAGNETIC LEVITATION TORQUE MOTOR

(71) Applicant: ZHEJIANG UNIVERSITY OF TECHNOLOGY, Hangzhou (CN)

(72) Inventors: Jian Ruan, Hangzhou (CN); Jiahui Huang, Hangzhou (CN); Zhankai Song, Hangzhou (CN); Bin Meng, Hangzhou (CN); Liangtao Han, Hangzhou (CN)

(73) Assignee: ZHEJIANG UNIVERSITY OF TECHNOLOGY, Hangzhou (CN)

( * ) Notice: Subject to any disclaimer, the term of this patent is extended or adjusted under 35 U.S.C. 154(b) by 237 days.

(21) Appl. No.: 18/358,384

(22) Filed: Jul. 25, 2023

(65) Prior Publication Data
US 2024/0030755 A1 Jan. 25, 2024

(30) Foreign Application Priority Data
Jul. 25, 2022 (CN) .......................... 202210879536.X

(51) Int. Cl.
*H02K 1/14* (2006.01)
*H02K 1/18* (2006.01)
*H02K 1/2791* (2022.01)

(52) U.S. Cl.
CPC ............. *H02K 1/145* (2013.01); *H02K 1/187* (2013.01); *H02K 1/2791* (2022.01); *H02K 2201/03* (2013.01)

(58) Field of Classification Search
CPC ....... H02K 1/145; H02K 1/2791; H02K 1/187
USPC ..................................... 310/254.1, 257, 263
See application file for complete search history.

(56) References Cited

U.S. PATENT DOCUMENTS

2018/0083505 A1* 3/2018 Yang .................... H02K 21/227

FOREIGN PATENT DOCUMENTS

| CN | 101126344 A | * | 2/2008 | .............. F02B 63/04 |
| CN | 201398097 Y | * | 2/2010 | |
| CN | 112769261 A | * | 5/2021 | |

* cited by examiner

*Primary Examiner* — Jose A Gonzalez Quinones
(74) *Attorney, Agent, or Firm* — Muncy, Geissler, Olds & Lowe, P.C.

(57) ABSTRACT

A claw-pole magnetic levitation torque motor includes a stator component and a rotor component. The stator component includes an end cover, upper and lower claw poles, coil skeletons, coils, and a flux guide sleeve. The cavity formed between the upper and lower claw poles accommodates the coil skeletons, on which coils are wound. The rotor component includes a ring-shaped shell, a permanent magnet, a base, and a shaft. The shell is fitted outside the claw poles, the bottom of the shell includes a base having a base platform shoulder, in the center of which a blind hole is opened. The lower end of the shaft is fixedly arranged in the blind hole, and the upper end of the shaft passes through the flux guide sleeve. The stator component is assembled with the rotor component through a gap-fitting between the magnetic guide sleeve and the shaft of the rotor component.

4 Claims, 5 Drawing Sheets

CLAW-POLE MAGNETIC LEVITATION TORQUE MOTOR

TECHNICAL FIELD

The present invention relates to a torque motor, particularly a claw-pole magnetic levitation torque motor.

BACKGROUND ART

The electro-hydraulic control system is widely used in critical fields such as aerospace, construction machinery, and robotics due to its high power-to-weight ratio, overload protection, and infinite speed control capabilities. As a control and regulating component, hydraulic valves are used to adjust hydraulic pressure, flow rate, or the direction of fluid flow, playing a crucial role in the overall system performance. Structurally, almost all valves consist of a spool, sleeve, electro-mechanical converter that drives the movement of the valve core. The electromechanical transducer serves as a bridge connecting the electrical and hydraulic parts of the hydraulic valve, making it an essential component. A moving-iron torque motor is a widely applied rotary electromechanical transducer in servo valves. It generates an output angular displacement by controlling the interaction between the control magnetic flux generated by the coil and the polarizing magnetic flux generated by the permanent magnet, resulting in a differential effect.

However, the current moving-iron torque motor has a small output angular displacement and exhibits negative magnetic stiffness, making it unable to automatically fix itself at the neutral position. To stabilize it at the neutral position, the application of zero-adjustment springs and zero-adjustment screws is required, which complicates the adjustment process, reduces accuracy, and adds complexity to the structure.

Invention Content

To overcome the aforementioned issues, the present invention provides a claw-pole magnetic levitation torque motor that utilizes the magnetic force generated by the polarizing magnetic flux between the stator and the rotor.

The technical solution employed in the present invention is as follows: A claw-pole magnetic levitation torque motor comprising a coaxial stator component and rotor component with a clearance fit.

The stator component comprises an end cover, claw poles, coil skeletons, coils, and a flux guide sleeve. The claw poles are positioned below the end cover and consist of an upper claw pole with downward-facing claw teeth and a lower claw pole with upward-facing claw teeth. The upper claw pole and the lower claw pole are closely fitted together, and the cavity formed between them houses the coil skeletons. The coil skeletons are rigidly connected to the claw poles through interference fit, and coils are wound around the coil skeletons. The end cover, claw poles, and coil skeletons are coaxially arranged and feature circular through-holes along the axis. The inner diameter of the circular through-holes is in interference fit with the outer diameter of the flux guide sleeve. The flux guide sleeve is inserted into the circular through-holes, and both the coil skeletons and the claw poles are firmly connected to the flux guide sleeve through interference fit. The upper end of the flux guide sleeve is fixedly connected to the end cover.

The rotor component comprises a ring-shaped shell, permanent magnets, a base, and a shaft. The ring-shaped shell is fitted outside the claw poles, and the bottom of the ring-shaped shell is equipped with a base. The base has a base platform shoulder with a blind hole at its center, and multiple positioning pins are arranged along the circumference of the base platform shoulder to locate the permanent magnets. The lower end of the shaft is fixedly positioned in the blind hole, and the upper end of the shaft passes through the flux guide sleeve of the stator component.

The inner wall of the ring-shaped shell is evenly spaced with multiple permanent magnets, and the permanent magnets correspond to the gaps between the positioning pins. The magnetic poles of adjacent permanent magnets are opposite in the radial direction. The gaps between the claw teeth of the upper and lower claw poles and the permanent magnets are considered as the working gaps, and the radial distance of the working gaps remains constant while the area of the working gaps changes with the rotation of the rotor component.

The shaft, shell, claw poles, coil skeletons, and flux guide sleeve are all made of materials with high magnetic permeability. The end cover and base are made of non-magnetic materials. The magnetization direction of the permanent magnets points towards the center of the claw poles.

When the rotor component is in the circumferential midpoint, each claw tooth aligns with two adjacent permanent magnets with opposite magnetic poles, and the facing areas are equal. The claw teeth experience equal and opposite cogging torque components from the two permanent magnets, resulting in a balanced suspension of the rotor component in the axial midpoint. When the rotor component generates angular displacement away from the circumferential midpoint, it experiences cogging torque from the claw teeth that tends to bring it back to the circumferential midpoint. Similarly, when the rotor component deviates from the axial midpoint, it experiences axial restoring force that tends to bring it back to the axial midpoint.

When the coils are energized, an axial magnetic flux is generated within the torque motor. This magnetic flux is converted into radial magnetic flux by the claw poles. The converted radial magnetic flux interacts with the polarizing magnetic flux generated by the permanent magnets in the gap between the rotor and the stator components. As a result, the magnetic flux density increases in some parts of the gap and decreases in other parts, causing the rotor component to generate angular displacement due to the differential effect.

Furthermore, the end cover is equipped with end cover threaded holes on the side, allowing it to be securely connected to the flux guide sleeve through these threaded holes. The base is equipped with base threaded holes on the side, allowing it to be fixedly connected to the shaft through these threaded holes.

Additionally, the axial cross-section of the claw teeth is either an isosceles trapezoid or a rectangle, and the claw teeth of the upper and lower claw poles are alternately distributed in the circumferential direction.

Moreover, the axial cross-section of the permanent magnets is either rectangular or sector-shaped, and the height of the top surface of the permanent magnets is slightly higher than the height of the top surface of the claw poles.

The present invention has the following beneficial effects:
1. Wide range of angular rotation: The present invention adopts a structure with a radial gap, eliminating mechanical limits during rotation. By adjusting the structural parameters of the claw poles, the range of angular rotation can be changed, achieving a large rotation angle that traditional moving-iron torque motors cannot achieve.
2. Positive magnetic stiffness and automatic adjustment to the axial and circumferential midpoint: Through the design of parameters between the stator and the rotor components, the rotor component will experience a force or torque that brings it back to the neutral position when it deviates from the axial or circumferential midpoint. The magnetic force between the stator and the rotor is utilized for automatic adjustment to the midpoint, eliminating the need for additional zero-adjustment screws and springs.

3. High torque density: The stator adopts a claw-pole structure and an external rotor configuration. Without the need to maintain a constant torque range, the utilization rate of the pole shoes can reach 100%. Therefore, the present invention has a higher torque density compared to traditional moving-iron torque motors.

DETAILED DESCRIPTION OF EMBODIMENTS

Figure 1:
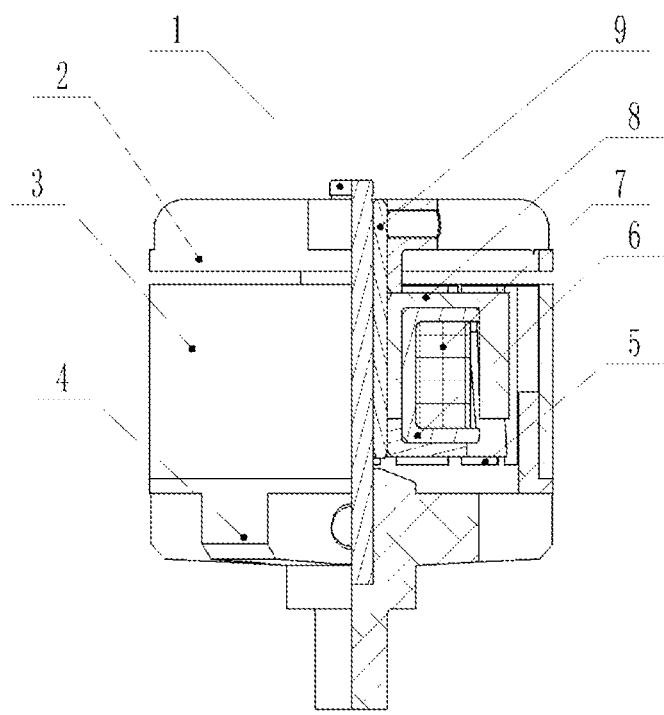
FIG. 1: An assembly schematic diagram of the present invention
Figure 2:
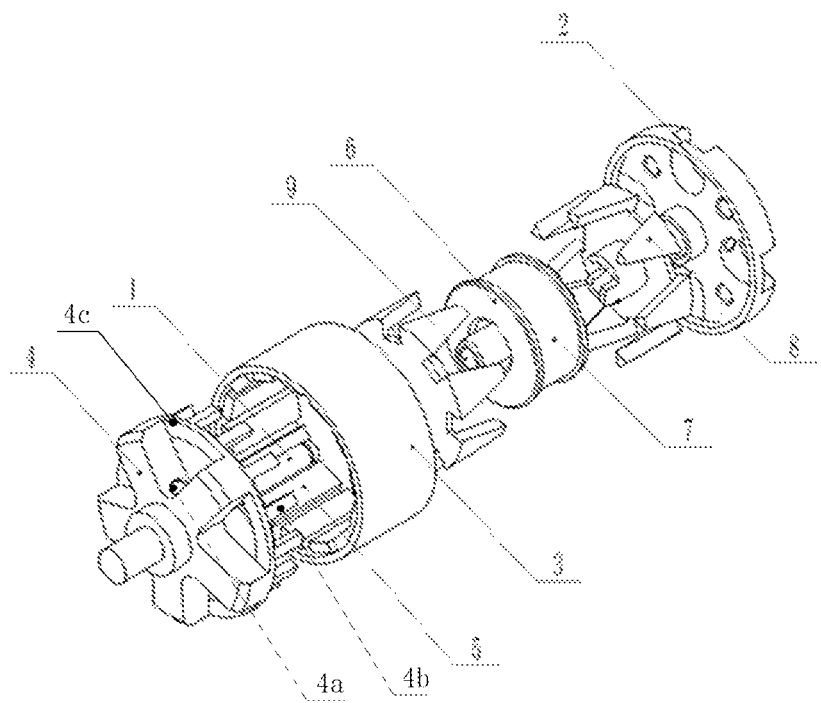
FIG. 2: An exploded view of the present invention
Figure 3:
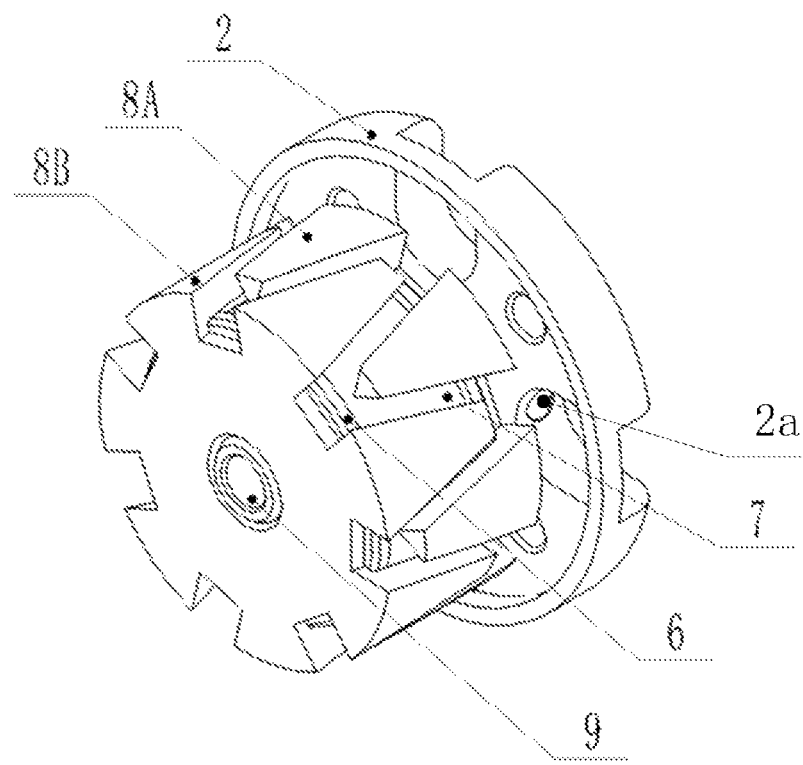
FIG. 3: A structural schematic diagram of the stator component
Figure 4:
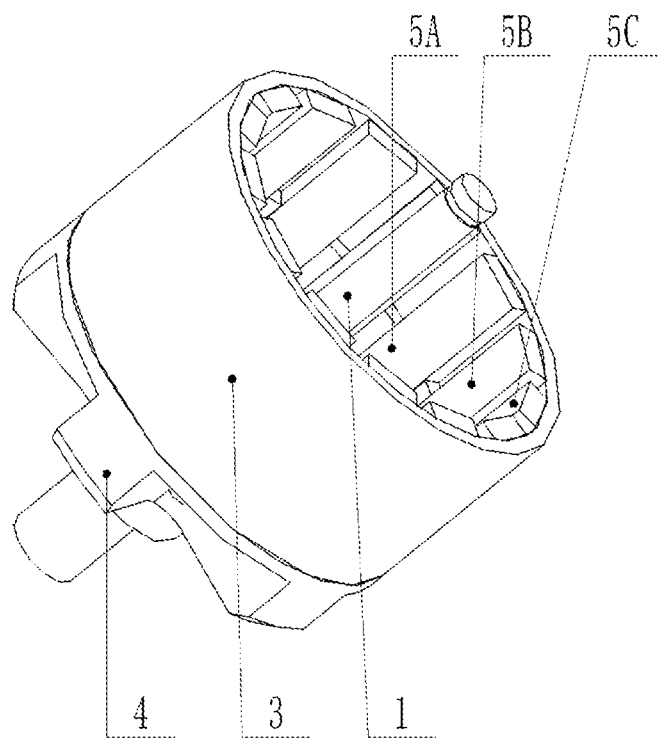
FIG. 4: A structural schematic diagram of the rotor component

In the following description of the technical solution of the present invention, reference will be made to the accompanying figures to provide a clear and complete depiction. It should be noted that the described embodiments are only a part of the embodiments of the present invention, and not the entirety. All other embodiments that ordinary skilled artisans in the field can obtain without exercising creative labor based on the embodiments disclosed in the present invention are within the scope of protection of the present invention.

In the description of the present invention, it is important to clarify that terms such as "center," "upper," "lower," "left," "right," "vertical," "horizontal," "inner," "outer," and the like, indicating orientations or positional relationships, are based on the orientations or positional relationships shown in the drawings. They are used for the purpose of facilitating the description and simplifying the explanation of the present invention, and should not be construed as limiting the devices or components to specific orientations or constructing and operating in specific orientations. Therefore, they should not be understood as limitations of the present invention. Additionally, terms such as "first," "second," "third," etc., are used for descriptive purposes and do not indicate or imply any relative importance.

In the description of the present invention, it is important to note that unless otherwise explicitly specified and limited, terms such as "installation," "connection," "coupling" should be broadly understood. For example, they can refer to fixed connections or detachable connections, mechanical connections or electrical connections, direct connections or indirect connections through intermediate media, and connections within the components. Skilled artisans in the field can understand the specific meanings of the above-mentioned terms in the context of the present invention based on specific circumstances.

Referring to the figures, the present invention comprises a coaxial stator component and rotor component with a clearance fit.

The stator component includes an end cover 2, claw poles 8, a coil skeleton 6, a coil 7, and a flux guide sleeve 9. The claw poles 8 are positioned below the end cover 2 and consist of an upper claw pole 8A with downward-facing claw teeth and a lower claw pole 8B with upward-facing claw teeth. The structure of the upper and lower claw poles is identical. The axial cross-section of the claw teeth can be trapezoidal, rectangular, or other combined curved shapes, including alternating curves. The claw teeth of the upper claw pole 8A and the lower claw pole 8B are interdigitated, with alternating distribution in the circumferential direction.

The cavity formed between the upper claw pole 8A and the lower claw pole 8B accommodates the coil skeleton 6. The coil skeleton 6 is rigidly connected to the claw poles 8 through an interference fit, and the coil 7 is wound around the coil skeleton 6. The end cover 2, claw poles 8, and coil skeleton 6 are coaxially arranged. Circular through-holes are provided along the axis on the end cover 2, claw poles 8, and coil skeleton 6, with the inner diameter of the circular through-holes in interference fit with the outer diameter of the flux guide sleeve 9. The flux guide sleeve 9 inserted into the circular through-holes, and both the coil skeleton 6 and the claw poles 8 are rigidly connected to the flux guide sleeve 9 through interference fit. The end cover 2 has an end cover threaded hole 2a on the side, through which it is fixedly connected to the flux guide sleeve 9.

The rotor component includes a ring-shaped shell 3, permanent magnets 5, a base 4, and a shaft 1. The ring-shaped shell 3 is fitted outside the claw poles 8, and the bottom of the ring-shaped shell 3 has a base 4. The base 4 is provided with a base shoulder 4c, and a blind hole is centrally opened in the base shoulder 4c. Multiple positioning pins 4b are arranged along the circumference of the base shoulder 4c to locate the permanent magnets 5. The lower end of the shaft 1 is fixedly positioned in the blind hole, while the upper end of the shaft 1 passes through the flux guide sleeve 9 of the stator component. The base 4 has a base threaded hole 4a on the side, through which it is fixedly connected to the shaft 1.

The inner wall of the ring-shaped casing 3 is spaced apart in the circumferential direction and contains multiple permanent magnets 5. The multiple permanent magnets 5 correspond to the empty spaces between the positioning pins 4b. The axial cross-section of the permanent magnets 5 is rectangular or fan-shaped, with the top surface height slightly higher than the top surface of the claw poles 8. The continuous three permanent magnets 5 are referred to as the first permanent magnet 5A, the second permanent magnet 5B, and the third permanent magnet 5C. The magnetic poles of the first permanent magnet 5A and the second permanent magnet 5B are opposite, and the magnetic poles of the second permanent magnet 5B and the third permanent magnet 5C are opposite. When the rotor component is in the midpoint in the circumferential direction, the area facing the upper claw pole 8A (Sa) is equal to the area facing the first permanent magnet 5A, and the area facing the upper claw pole 8A (Sb) is equal to the area facing the second permanent magnet 5B. The area facing the lower claw pole 8B (Sc) is equal to the area facing the second permanent magnet 5B, and the area facing the lower claw pole 8B (Sd) is equal to the area facing the third permanent magnet 5C. The area facing the upper claw pole 8A (Sb) is equal to the area facing the lower claw pole 8B (Sc). The working gap exists between the claw teeth of the upper claw pole 8A, the claw teeth of the lower claw pole 8B, and the permanent magnets 5. The radial distance of the working gap remains constant, while the area of the working gap changes with the rotation of the rotor component.

The shaft 1, casing 3, claw poles 8, coil skeleton 6, and flux guide sleeve 9 are made of materials with high magnetic permeability. The end cover 2 and base 4 are made of non-magnetic materials. The magnetic orientation of the permanent magnets 5 points towards the center of the claw poles 8.

During assembly, the stator component is assembled with the rotor component using a clearance fit between the flux guide sleeve 9 and the shaft 1, forming a claw pole magnetic suspension torque motor with positive magnetic stiffness. The base 4, permanent magnets 5, casing 3, and shaft 1 are connected using industrial adhesive and bolts to form the rotor component. After positioning the casing 3 with the base shoulder 4c, it is fixedly connected to the base 4 using industrial adhesive. After positioning the permanent magnets 5 with the positioning pins 4b, they are fixedly connected to the casing 3 using industrial adhesive. The base 4 is fixedly connected to the shaft by passing a bolt through the threaded hole 4a.

Figure 5:
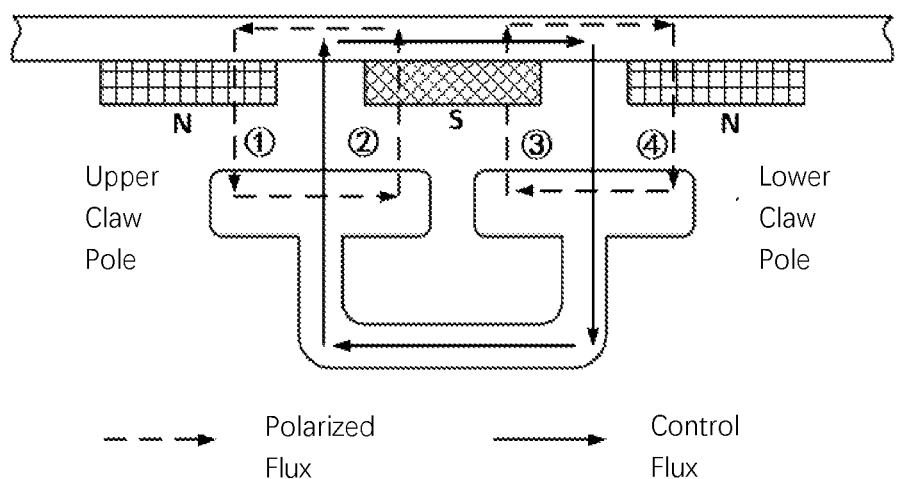
FIG. 5: A schematic diagram illustrating the working principle of the coil with loaded current
Figure 6:
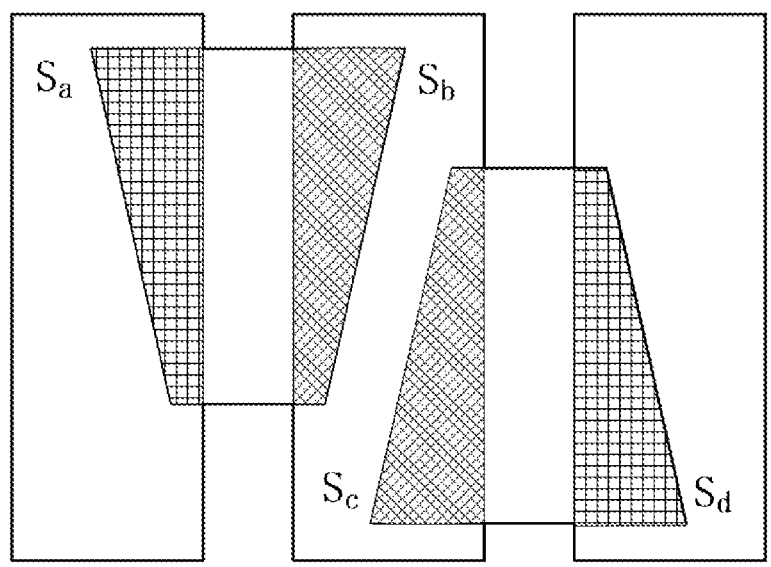
FIG. 6: A schematic diagram illustrating the relative position of the claw pole's teeth and the permanent magnet when the rotor is in the midpoint

The specific principle is as follows: When the coil is not energized, the present invention utilizes the restoring force and cogging torque between stator and rotor to suspend the rotor in the axial and circumferential middle positions. The cogging torque always tries to align the centerline of the permanent magnet with the centerline of the stator teeth or stator slots. In the present invention, when the centerline of the stator slot coincides with the centerline of the permanent magnet, the forces generated on both sides of the claw teeth due to the polarized magnetic flux cancel each other out, resulting in a zero cogging torque. When a counterclockwise angular velocity is applied to the rotor, the tangential component of the polarized magnetic flux cannot be completely canceled out, resulting in a counterclockwise torque on the stator. According to the principle of action and reaction, the permanent magnet experiences a clockwise torque, attempting to return to its initial position. FIG. 5 illustrates the working principle after the coil is energized. The control magnetic flux generated by the coil interacts with the polarized magnetic flux generated by the permanent magnet at the working gaps ①, ②, ③, and ④, resulting in a decrease in magnetic flux density at gaps ① and ③ and an increase in magnetic flux density at gaps ② and ④, causing the rotor to start rotating counterclockwise. After the coil is de-energized, the rotor is acted upon by magnetic forces in the axial and circumferential directions, automatically returning to the middle position.

Figure 7:
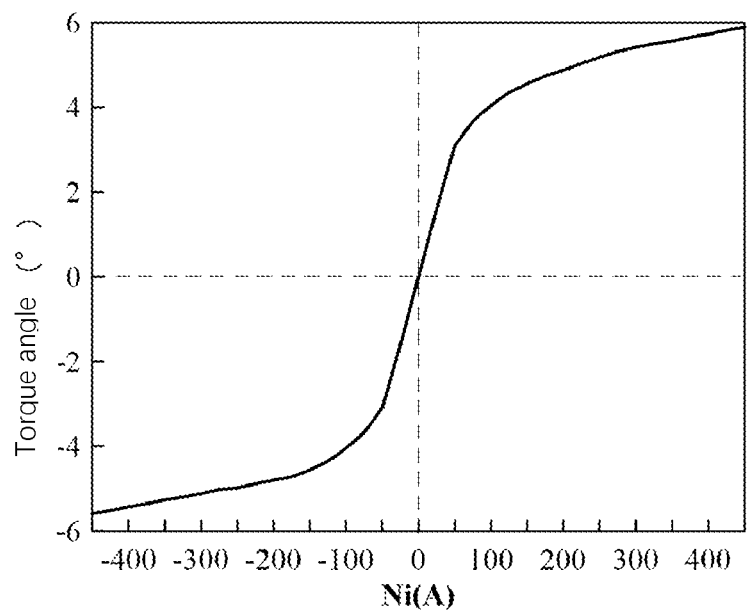
FIG. 7: A characteristic curve of angular displacement versus control current
Figure 8:
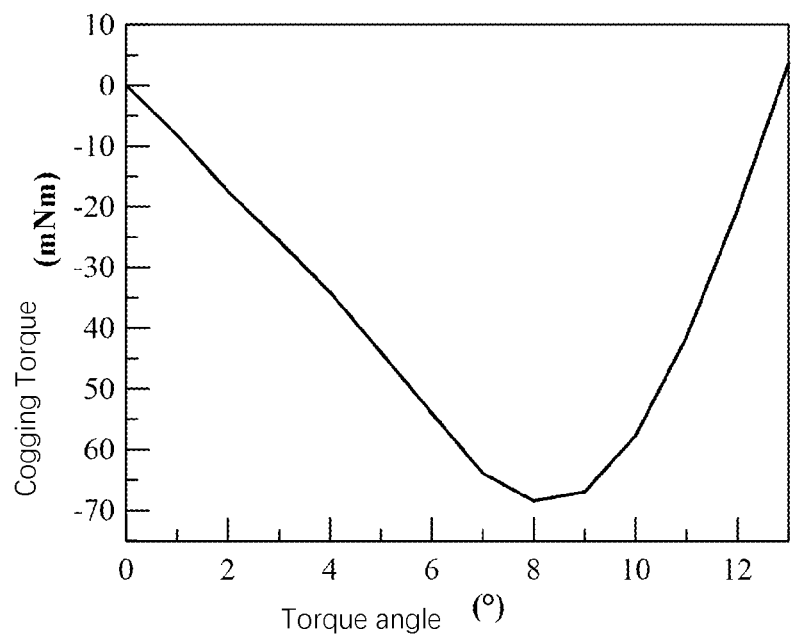
FIG. 8: A characteristic curve of torque-angle when the coil has no current
Figure 9:
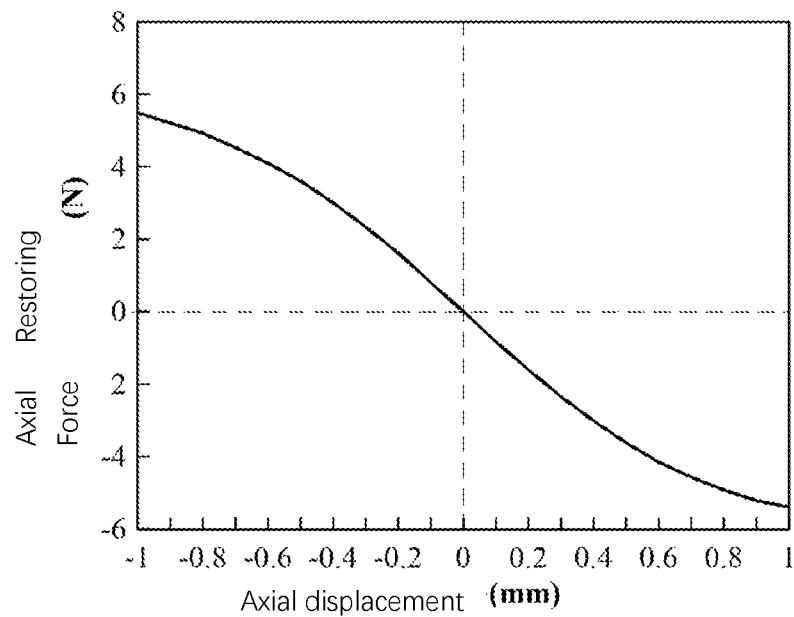
FIG. 9: A characteristic curve of axial displacement versus axial restoring force when the coil has no current
Figure 10:
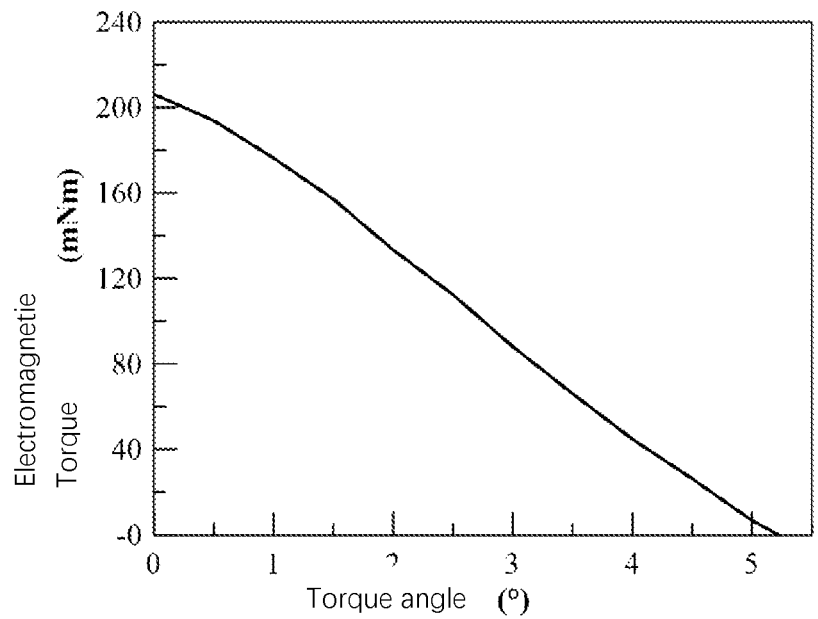
FIG. 10: A characteristic curve of torque-angle when the coil has loaded current Figure notation explanation: 1. Shaft; 2. End cover; 2a. End cover threaded hole; 3. Casing; 4. Base; 4a. Base threaded hole; 4b. Base positioning pin; 4c. Base shoulder; 5A. First permanent magnet; 5B. Second permanent magnet; 5C. Third permanent magnet; 6. Coil skeleton; 7. Coil; 8A. Upper claw pole; 8B. Lower claw pole; 9. Flux guide sleeve; Sa. Area facing the upper claw pole of the first permanent magnet; Sb. Area facing the upper claw pole of the second permanent magnet; Sc. Area facing the lower claw pole of the second permanent magnet; Sd. Area facing the lower claw pole of the third permanent magnet.

FIG. 7 shows the angular displacement-control current characteristic curve. With counterclockwise as the positive direction, when the rotor angular displacement ranges from −2.5° to 2.5°, the rotor angular displacement increases linearly with the increase of control current, exhibiting good linearity, which is beneficial for proportional control. FIGS. 8, 9, and 10 demonstrate that the present invention possesses positive magnetic stiffness in both the axial and circumferential directions. FIG. 8 presents the torque-angle characteristic curve when the coil is not energized. When a counterclockwise angular displacement is applied to the rotor, the rotor experiences a clockwise cogging torque, which always tries to return the rotor to the circumferential midpoint. FIG. 9 shows the axial displacement-axial restoring force characteristic curve when the coil is not energized. When an axial displacement is applied to the rotor, the rotor experiences an axial restoring force opposite to the direction of the axial displacement, which always tries to return the rotor to the axial midpoint. FIG. 10 presents the torque-angle characteristic curve when the coil is energized. When the rotor is in the midpoint and the magnetic field generated by a current of 200 A, the output torque generated by the present invention can reach 208 mNm. As the rotor misalignment angle increases, the output torque gradually decreases until it reaches zero.

The content described in the embodiments of this specification is merely illustrative of the embodiment of the inventive concept. The scope of protection of the present invention should not be construed as being limited to the specific forms described in the embodiments. The scope of protection of the present invention also extends to equivalent technical means that skilled artisans in the field can conceive based on the inventive concept.

The invention claimed is:

1. A claw-pole magnetic levitation torque motor comprising a coaxial stator component and rotor component with a clearance fit;

The stator component includes an end cover (2), claw poles (8), a coil skeleton (6), a coil (7), and a flux guide sleeve (9); the claw poles (8) are positioned below the end cover (2) and consist of an upper claw pole (8A) with downward-facing claw teeth and a lower claw pole (8B) with upward-facing claw teeth, the upper claw pole (8A) and lower claw pole (8B) are interdigitated, and the cavity formed between them houses the coil skeleton (6); the coil skeleton (6) is rigidly connected to the claw poles (8) through an interference fit, and the coil (7) is wound around the coil skeleton (6), the end cover (2), claw poles (8), and coil skeleton (6) are coaxially arranged; circular through-holes are provided along the axis on the end cover (2), claw poles (8), and coil skeleton (6), with the inner diameter of the circular through-holes in interference fit with the outer diameter of the flux guide sleeve (9); the flux guide sleeve (9) is inserted into the circular through-holes, and both the coil skeleton (6) and claw poles (8) are rigidly connected to the flux guide sleeve (9) through interference fit; the upper end of the flux guide sleeve (9) is fixedly connected to the end cover (2);

The rotor component includes a ring-shaped casing (3), permanent magnets (5), a base (4), and a shaft (1), the ring-shaped casing (3) is fitted outside the claw poles (8), and the bottom of the ring-shaped casing (3) has a base (4), the base (4) is provided with a base shoulder (4c), and a blind hole is centrally opened in the base shoulder (4c), multiple positioning pins (4b) are arranged along the circumference of the base shoulder (4c) to locate the permanent magnets (5), the lower end of the shaft (1) is fixedly positioned in the blind hole, while the upper end of the shaft (1) passes through the flux guide sleeve (9) of the stator component;

The inner wall of the ring-shaped casing (3) is spaced apart in the circumferential direction and contains multiple permanent magnets (5), each permanent magnet (5) corresponds to a gap between adjacent positioning pins (4b), the magnetic poles of adjacent permanent magnets (5) are opposite in the radial direction, the working gap exists between the claw teeth of the upper claw pole (8A), the claw teeth of the lower claw pole (8B), and the permanent magnets (5), the radial distance of the working gap remains constant, while the area of the working gap changes with the rotation of the rotor component;

The shaft (1), casing (3), claw poles (8), coil skeleton (6), and flux guide sleeve (9) are made of materials with high magnetic permeability, the end cover (2) and base (4) are made of non-magnetic materials, the magnetic orientation of the permanent magnets (5) points toward the center of the claw poles (8);

When the rotor component is in midpoint in the circumferential direction, each claw tooth faces two adjacent permanent magnets (5) with opposite magnetic poles, and the areas facing the claw teeth are equal, the claw teeth experience opposing torque components from the two permanent magnets (5), which are equal in magnitude and opposite in direction, resulting in a balanced force on the rotor component, keeping it suspended in the axial midpoint, when the rotor component deviates from the circumferential midpoint, it experiences a cogging torque that tries to return it to the circumferential midpoint, similarly, when the rotor component deviates from the axial midpoint, it experiences an axial restoring force that tries to return it to the axial midpoint;

When the coil (7) is energized, axial magnetic flux is generated in the motor, which is then converted into radial magnetic flux by the claw poles (8), the converted radial magnetic flux combines with the polarized magnetic flux generated by the permanent magnets (5) in the air gap between the rotor and stator components, this results in an increase in magnetic flux density in some portions of the air gap and a decrease in magnetic flux density in other portions, causing the rotor component to experience angular displacement under the differential action.

2. A claw-pole magnetic levitation torque motor as claimed in claim 1, further comprising: the end cover (2) is provided with an end cover threaded hole (2a) on the side, and the end cover (2) is fixedly connected to the flux guide sleeve (9) through the end cover threaded hole (2a); the base (4) is provided with a base threaded hole (4a) on the side, and the base (4) is fixedly connected to the shaft (1) through the base threaded hole (4a).

3. A claw-pole magnetic levitation torque motor as claimed in claim 1, wherein: the axial cross-section of the claw teeth is an isosceles trapezoid or rectangle, and the claw teeth of the upper claw pole (8A) and the lower claw pole (8B) are alternately distributed in the circumferential direction.

4. A claw-pole magnetic levitation torque motor as claimed in claim 1, wherein: the axial cross-section of the permanent magnets (5) is a rectangle or sector-shaped, and the top surface height of the permanent magnets (5) is slightly higher than the top surface height of the claw poles (8).

* * * * *